April 14, 1953     A. P. SORBER     2,634,608
LIQUID LEVEL GAUGE
Filed Oct. 24, 1947     3 Sheets-Sheet 1
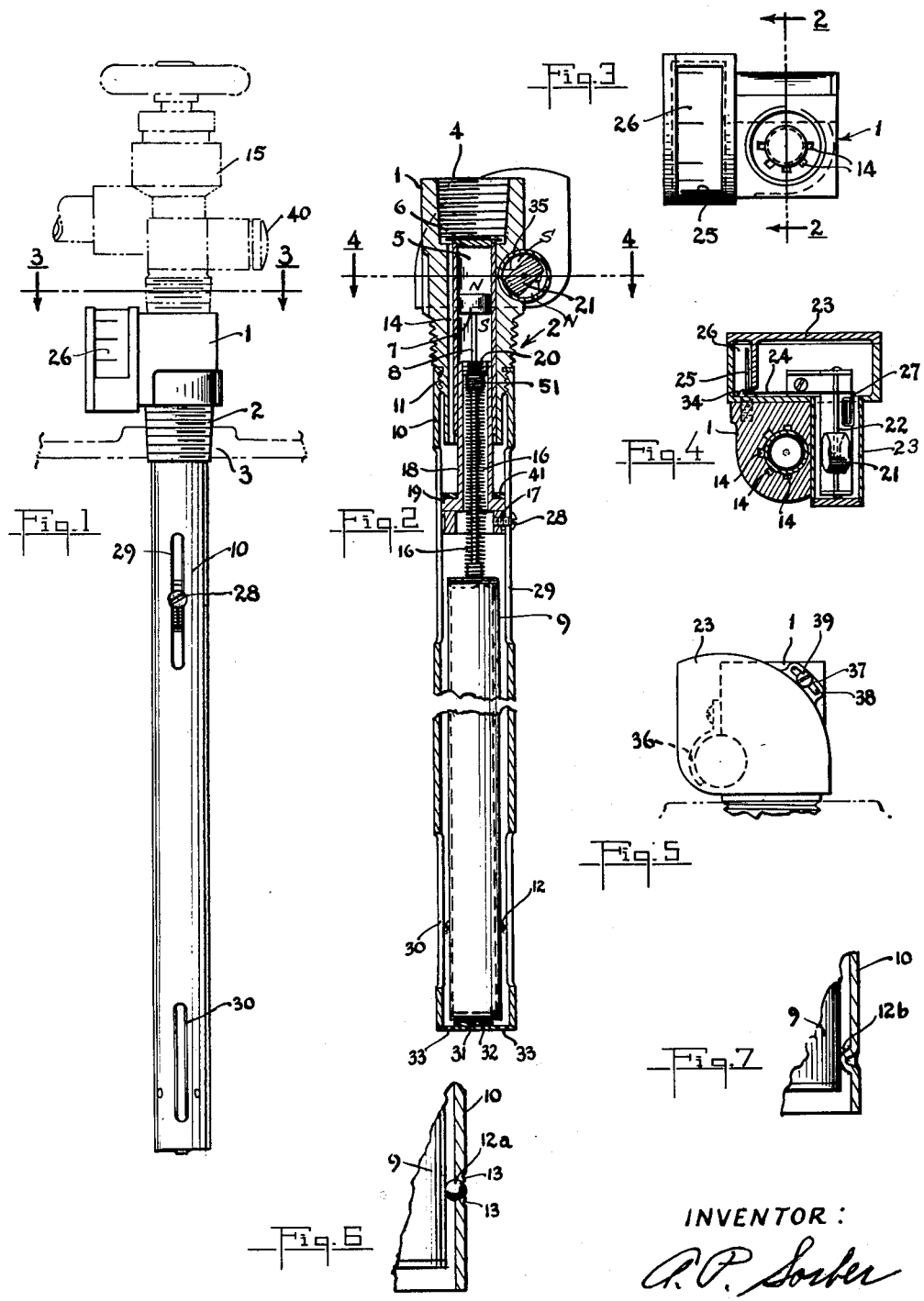
INVENTOR:
A. P. Sorber

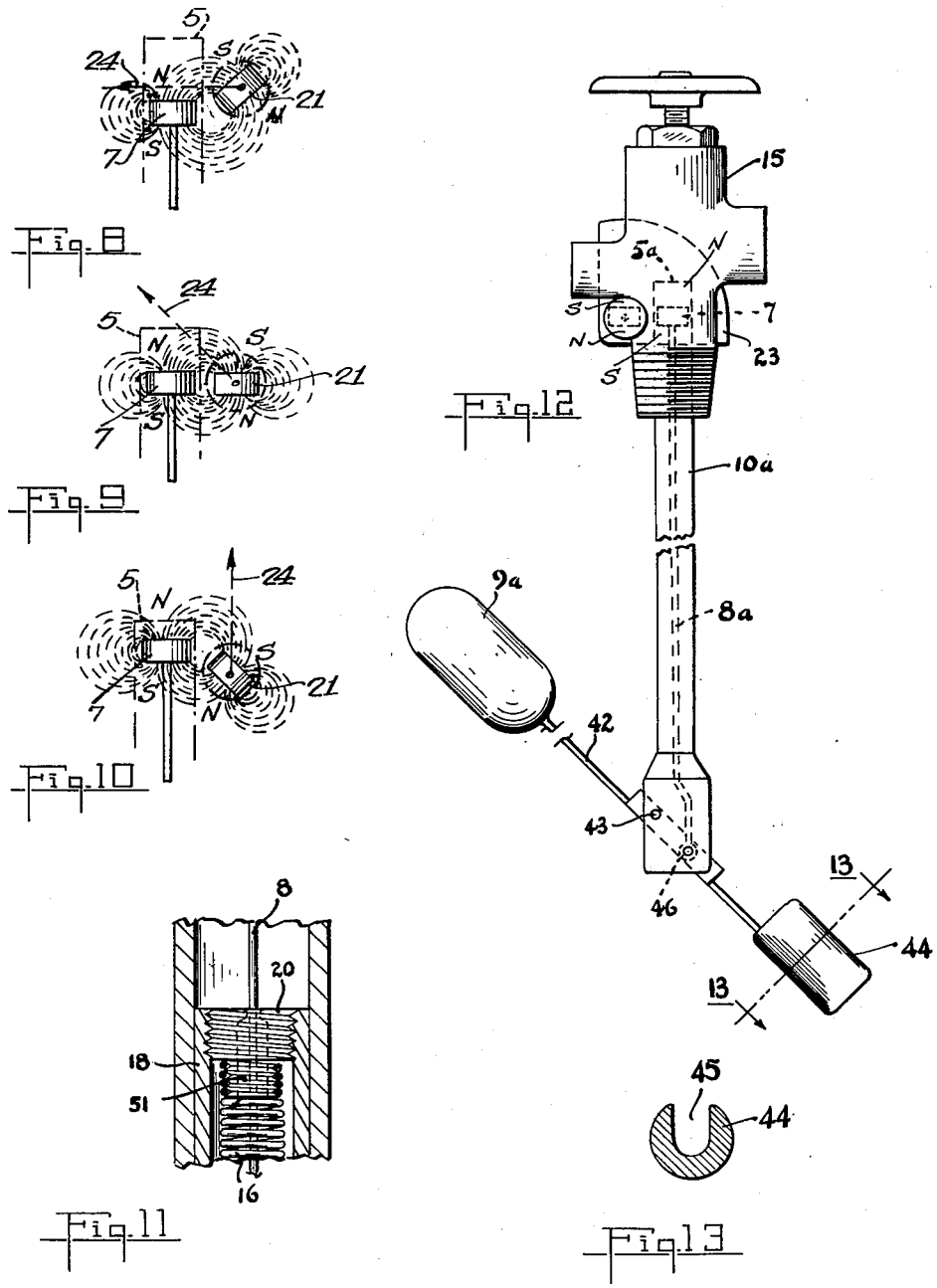

April 14, 1953

A. P. SORBER 2,634,608

LIQUID LEVEL GAUGE

Filed Oct. 24, 1947

INVENTOR.
A. P. Sorber

Patented Apr. 14, 1953

2,634,608

UNITED STATES PATENT OFFICE 2,634,608

LIQUID LEVEL GAUGE

A. P. Sorber, North Hollywood, Calif.

Application October 24, 1947, Serial No. 781,822

9 Claims. (Cl. 73—305)

The invention herein disclosed relates to gauges, and more particularly to gauges for indicating the quantity of liquid within a tank or reservoir.

The illustrative embodiments about to be described are particularly adaptable for installation in tanks not initially supplied with gauges, such as the butane tanks with which many trailers and small homes are at the present time equipped.

One of the objects of my invention is to provide a gauge that may readily be interposed between the filling valve and its fitting merely by removing the valve, screwing the gauge into the opening from which the valve has been taken, and then threading the valve into the top of the gauge device.

Another object of my invention is to provide a liquid level gauge in combination with the usual valve assembly to control the inflow of liquid and the outflow of gas.

Another of the objects of my invention is the provision of means in a gauge of the class described in which the inflowing liquid will not come in contact with the upper portions of the gauge mechanism.

A further object is to provide a gauge in which the parts that are to be disposed in the tank are so arranged and proportioned that they may be inserted through the female opening provided for the filling valve in a tank not originally equipped with a gauge.

Another object is the provision of a structure in which the scale and indicating hand may be positioned entirely outside the tank.

In order to make it unnecessary to provide a sealed housing for the scale and indicating hand to prevent a passage between the inside of the tank and the outside atmosphere, a further object of my invention is the provision of means for transmitting motion from the parts of my gauge within the tank to the indicating hand outside the tank through an intervening wall without an opening.

A further object of my invention is to provide magnetic means for transmitting motion from a rectilinearly movable member within the tank to an angularly movable member outside the tank.

Another object is the provision of simple means for initially adjusting my gauge for zero reading when the tank is empty.

Still another object is to provide means for adjusting the relationship between the calibrations and the indicator to compensate for distortion in the magnetic field between the aforementioned rectilinearly movable member and the angularly movable member due to the proximity of ferrous material.

Another object of my invention is the provision of guiding means for the rectilinearly movable parts of my gauge.

Yet another object is the provision of means for reducing the friction between the relatively movable parts of the structure.

Another object is to provide means whereby the fluid in the tank may readily flow into the cylindrical guide surrounding my rectilinearly movable float so that the said float will respond to a liquid level that is substantially the same as that of the liquid within adjacent portions of the tank.

Another object of my invention is to provide means within my gauge device whereby the liquid passageways therethrough will be closed automatically to prevent the excessive flow of gas from the tank in case of injury to the valve or other external parts.

An additional object is to provide a design that is simple, inexpensive and durable.

Still other objects will be apparent throughout the specification.

In the drawings:

Fig. 1 is a front elevation of my device showing the top of the tank and the valve in broken lines.

Fig. 2 is the side elevation, partly broken away, of the embodiment shown in Fig. 1.

Fig. 3 is a plan view taken along line 3—3 of Fig. 1.

Fig. 4 is a section taken along line 4—4 of Fig. 2.

Fig. 5 is a side view of the top portion of my device showing the means for adjusting the dial housing for certain compensation purposes hereinafter explained.

Fig. 6 is a detailed view, partly in section, showing the use of a ball for reducing friction between my longitudinal float and the guide tube in which it is enclosed.

Fig. 7 is a view similar to that of Fig. 6, but showing an embossed portion adapted to be engaged by the float in order to reduce friction between the guide and said float.

Figs. 8, 9 and 10 show the magnetic fields about the magnetic elements in my device whereby longitudinal movement is converted into angular movement without physical engagement between the rectilinearly and angularly movable systems.

Fig. 11 is an enlarged view of certain of the parts shown in Fig. 2, showing how the spring that partially supports the float in the preferred embodiment of my invention is attached at the top.

Fig. 12 shows a modified form of my invention.

Fig. 13 is a cross section taken along line 13—13 of Fig. 12.

Figure 14:
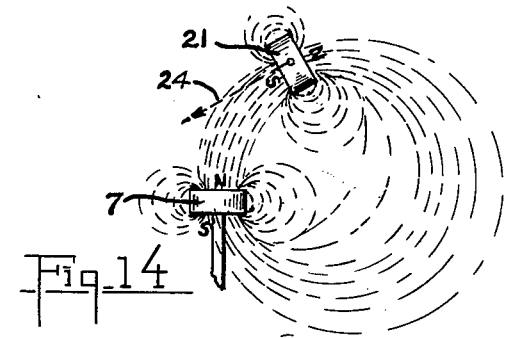
Figs. 14 to 18 are similar to Figs. 8, 9, and 10, and illustrate the wide angle of rotation of the rotatable magnetic element that is possible in my device in response to the rectilinear movement of the other magnetic element.
Figure 15:
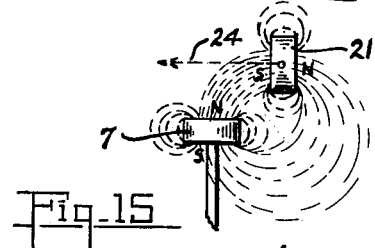

In the embodiments of my invention here described for purpose of illustration, my device is assembled generally around a member 1 having a threaded lower end 1' adapted to be screwed into the threaded hole 3 (Fig. 1) in the top of the tank into which the customary valve assembly is generally threaded. Member 1 has an internally threaded upper end 4 adapted to receive the male-threaded end of the valve assembly that is normally placed in the opening 3 in tanks not initially equipped with a gauge. It will thus be clear that the upper portion 1 of my gauge is interposed between the usual valve assembly and the socket into which such assembly is conventionally mounted.

Member 1 has a central recess or cavity 5 extending upwardly from the lower end of member 1. This recess has a closed upper end. Such a closed upper end may be effected merely by providing a recess that is not sufficiently long to extend into the upper threaded portion 4, or else the recess may extend all the way through from the lower portion of member 1 to the threaded section 4 and the top end of the recess 5 closed by means of a cap 6 such as that illustrated in Fig. 2.

Magnetic element 7, preferably constructed of Alnico or other similar magnetic material, is arranged in recess 5 for rectilinear movement therein. Element 7 is connected by means of a rod 8 to an elongated cylindrical float 9, which moves within a tubular casing 10 threadedly attached to a threaded reduced portion 11 of member 1.

In order to reduce friction between float 9 and the inner walls of the guide tube 10, this tube is provided with rounded bearing portions 12 as illustrated generally in Figs. 2, 6 and 7. Two forms of these are illustrated. In Fig. 6 a ball 12a is shown nesting in a cup, which consists of a hole having peened-over edges 13. In Fig. 7 another arrangement is illustrated for serving the same general purpose. In this modification an embossed nodule is shown pressed in the side of the tube. These rounded points 12 serve as guides or ways for the float 9.

When the tank is being filled, it is desirable to keep the inflowing liquid from entering the recess 5. Accordingly, a separate channel or channels may be provided between the upper socket 4 and the lower end of member 1. In practice I use a plurality of ducts, one of which, 14, may be seen in Fig. 2. The upper end of these ducts may be seen in Fig. 3 and they also appear in Fig. 4 in which the cross-sectional view cuts through them. Not only does the inflowing liquid pass through these channels 14, but the gas from the tank also passes upward through them to the appropriate valve in the valve assembly 15, shown in dotted lines in Fig. 1.

Part of the weight of the float 9 is carried by a spring 16 threadedly attached to a boss provided on the upper end of the float. The upper end of this spring is attached to the top portion of a sleeve 18 supported by a ring 17 which may be initially adjusted to any longitudinal position within the tube 10. The sleeve 18 is provided with a flange 19 at its lower end. This flange normally rests on the top surface of ring 17. Sleeve 18, of course, surrounds spring 16 which in turn surrounds the rod 8. In order to provide means for attaching the upper end of spring 16 at the upper end of sleeve 18, a threaded member 20 is threaded into appropriate threads in the top end of sleeve 18. Member 20 has a reduced portion 51 which is threaded to receive the spring 16 as shown in Figs. 2 and 11. In addition to supporting spring 16, sleeve 18 has other functions which will hereinafter be described.

My device may be adapted to measuring the height of liquids of different specific gravity merely by selecting a spring of the proper tension to carry an appropriate portion of the weight of the float.

In order to prevent the unnecessary escape of gas through my device, it is desirable that no outside opening be provided through member 1 other than that afforded by the socket 4. I therefore transmit motion from the float 9, rod 8 and element 7 attached thereto by magnetic means acting through the wall of member 1. This member, or at least the said wall thereof, must accordingly be formed of non-ferrous material. The transmission of motion through this wall is effected by an assembly shown in cross section in Fig. 4. A rotatable magnetic element 21 is mounted on a shaft 22 journaled by appropriate means within a housing 23. An indicator 24, formed of a strip of metal, is bent as shown in Fig. 4. The free end 25 is arranged at right angles to the main arm of member 24 to act as an indicating hand sweeping over the calibrated scale 26. The opposite end of member 24 may be rolled over as shown at 27 in Fig. 4 to act as a counterbalance. The rotation of magnetic element 21 thus causes the hand 25 to move across the calibrated scale 26. In order to provide an adequate angle of rotation for magnetic element 21, it is pivoted intermediate its north and south poles, substantially as indicated in Figs. 2, 8, 9 and 10, and magnetic element 7 is mounted so that its poles are disposed approximately in alignment with the rod 8. The distance between the poles of these elements should not be materially greater than the diameter of the said elements if the maximum angular rotation of element 21 is to be achieved for a given linear movement of element 7. If the magnetic elements are not cylindrical in shape, or are irregular in cross section, then the average distance through any magnetic element in a direction transverse to its magnetic axis should not be materially less than the distance between its magnetic poles. In Fig. 2 the rectilinearly movable magnetic element 7 is shown at substantially the position illustrated in Fig. 8. When element 7 is in this position relative to element 21, the magnetic lines of force are such that element 21 will be disposed in substantially the angular position shown in Figs. 2 and 8. As member 7 moves upward, the lines of force will cause element 21 to rotate to the angular position illustrated in Fig. 9. When element 7 is located above element 21 in substantially the position shown in Fig. 10, element 21 will occupy the position which Fig. 10 illustrates. The position of the indicating hand is indicated generally in broken lines in Figs. 8, 9 and 10.

The relative positions of the magnetic elements shown in Figs. 8, 9, and 10 are the exact positions for 90 degrees of pointer rotation that these elements occupy when the device is constructed as shown in Figs. 1 to 5. The relatively great angular movement of member 21 for the short rectilinear movement of element 7 is in large part due to the contour of these magnetic elements, as hereinbefore set forth. The relatively short distance bewteen the poles of these magnetic elements as compared to their width or diameter results in magnetic fields that are not materially distorted from their natural circular shape and contributes greatly to the large angular movement. The shape of the magnetic fields and the direction of the magnetic lines shown in these figures is not theoretical but has been determined by accurately plotting the field strength and its pattern.

The use of magnetic elements disposed as shown in the drawings and having substantially the shape indicated, is capable of producing much greater angular movement of element 21 in response to the rectilinear movement of element 7 than has been shown in Figs. 8 to 10. This angular movement may be as much as 270 degrees and it is very stable over approximately 240 degrees. The useful angular rotation that rotatable element 21 may be given in response to rectilinear movement of element 7 is shown in Figs. 14 to 18.

Figure 16:
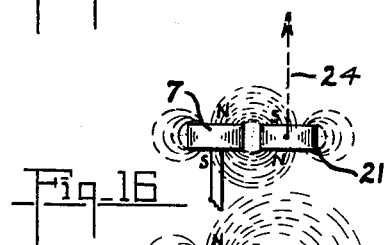
Figure 17:
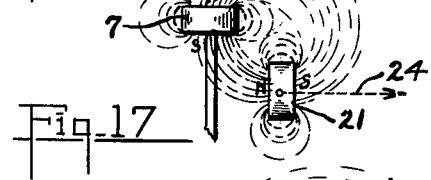
Figure 18:
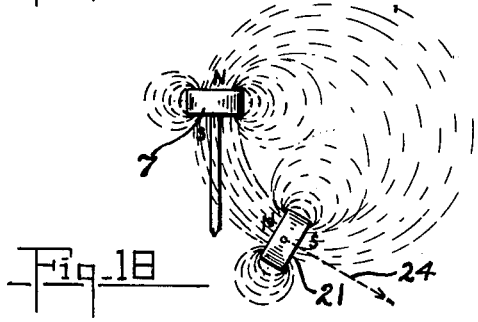
Figure 19:
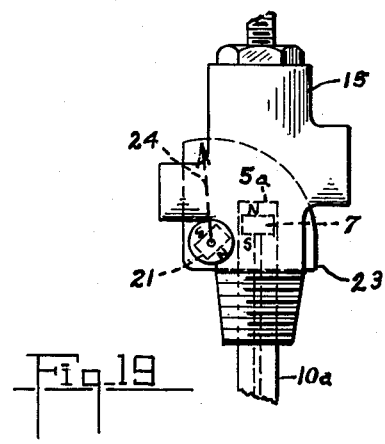
Fig. 19 shows a portion of the assembly shown in Fig. 12 but the magnetic elements are in the position shown in Fig. 10.
Figure 20:
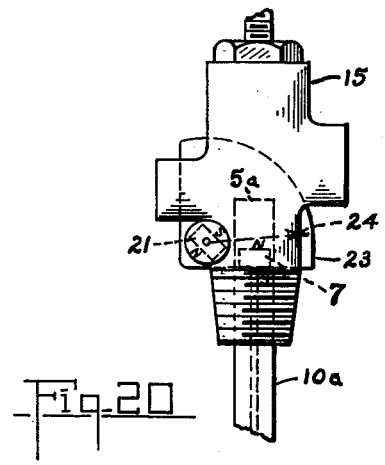
Fig. 20 is another view similar to Fig. 19 but the magnetic elements are in the position shown in Fig. 8.

It will be noted in Figs. 9 and 16 that when the rotational axis of element 21 is in a plane that passes through the center of the rectilinearly movable element and that is perpendicular to the path of motion of the rectilinearly movable member that the magnetic axes of these two elements are substantially parallel.

A bumper or rest for the float 9 is provided at the bottom of tube 10. This comprises a disc 31 suitably attached to the bottom end of the tube. A resilient washer 32 is appropriately attached to the center portion of disc 31. This washer should be made of material that is insoluble in the liquid to be placed in the tank. When this liquid is butane, a neoprene washer is satisfactory. A series of holes 33 is circularly arranged around disc 31 between the bumper 32 and the walls of tube 10, to permit the ready flow of liquid in or out of the tube.

To permit the easy flow of liquid through tube 10 it is provided with a plurality of slots 29 and 30.

Regardless of the tension that may be required in the spring 16 for a given fluid, it is necessary that the float 9 be capable of reaching the bottom of its longitudinal stroke when the tank is empty. In order to bring this about, a compensating adjustment for the tension of the spring is provided for. Such compensation is effected by means of the ring 17 and screw 28, which passes through slot 29 in tube 10 and is threaded into member 17. Inasmuch as the sleeve 18, from the upper end of which spring 16 is suspended, rests upon ring 17 it can readily be understood that the adjustment of member 17 up or down the tube will cause the tension on spring 16 to increase or decrease. Accordingly, ring 17 is adjusted at the factory to a longitudinal position within the tube that will cause float 9 to come as close as possible to the bumper 31 without actually touching it. Set screw 28 is then tightened to secure ring 17 in such adjusted position.

As the tank is filled, it will be seen that magnetic element 7 will rise or fall with the float 9 and that this motion will be transmitted magnetically to the element 21, from which the motion is carried to the indicating hand 25 so that this hand will at all times indicate the level of the liquid within the tank.

It will be observed that the housing for the scale, indicator, and rotatable magnetic element, consist, in the embodiment shown, of the cylindrical portion surrounding the magnetic element 21 and a larger arcuate portion for the dial and the indicating hand. This housing may be attached to member 1 by a single screw 34 shown in Fig. 4. The tubular portion of the housing fits into a semi-circular recess 35 in the side of member 1 as shown in Fig. 2. This arrangement prevents any angular movement of the housing, and screw 34 consequently serves only to hold the housing 23 against member 1 and to prevent the housing from rotating around the tubular portion of the housing containing element 21.

If the tank is formed of ferrous material such material will distort the magnetic field surrounding the magnetic element, resulting in a false reading that must be compensated for. The calibration is also affected by the distance that member 1 is screwed down into the opening 3 in the tank. Means of compensation for such variations are shown in Fig. 5, in which a clamp 36 is shown for rotatably mounting the housing 23 on member 1. This housing is provided with a short flange 37 having a slot 38. A clamping screw 39 passes through slot 38 and is threaded into member 1. When screw 39 is loosened, the housing 31, supporting the scale, may be angularly adjusted to bring the reading to zero regardless of the effect of the ferrous metal of the tank upon the previously described magnetic elements.

If the tank is filled with a fluid such as butane, which produces a gas, it is desirable that none of the gas escape unless the pressure within the tank reaches a dangerous point. To prevent the building up of excessive pressures, the usual valve combination 15 through which the tank is filled and through which the gas passes for use, is normally provided with some sort of pop-off valve 40 which is not here described in detail because it forms no part of this invention. Should leakage develop in the valve assembly 15, or should such valve or the external parts of my gauge be broken off, it is desirable that means be provided to prevent the too rapid flow of gas from the tank. This is taken care of by the sleeve and flange arrangement 18—19 shown in Fig. 2. A resilient washer 41 rests on the upper surface of the flange 19 of member 18. Excessive flow of gas from the tank will cause flange 19 to be pushed upwardly until washer 41 comes in contact with the lower end of the ducts 14, through which the gas passes.

A complete shut off is prevented by employing a washer with an uneven upper surface, or by recessing the mouth of at least one of the orifices 14, or by providing a small bypass into at least one of the orifices. When no such excessive flow is present, the weight of sleeve 18 and the float structure suspended therefrom is sufficient to cause the flange 19 of sleeve 18 to rest upon the ring 17.

In the embodiment of my device that has just been described it will be observed that the dimensions of the reduced end of member 1 and the tube 10 are such that the entire structure attached to the lower end of member 1 may be inserted into the tank through the opening provided for the ordinary valve assembly. It is thus possible readily to install my gauge device in tanks normally provided only with the usual valve structure.

Fig. 12 shows a modified form of my invention. In this species, a member 10a is inserted into the lower end of the recess 5a that is provided for the rectilinearly movable magnetic element 7. Member 10a need not necessarily be tubular, as its function is merely to support a lever system at its lower end. Such a lever 42 is shown pivoted to member 10a at point 43. This lever carries a float 9a and a counterbalance 44. A rod 8a operatively connects element 7 to lever 42 at a point 46 which is displaced from the pivot 43 by an amount sufficient to give the magnetic element 7 the required longitudinal movement for a given arcuate rise or fall of the float 9. To permit this structure to be inserted into the tank, the counterbalance 44 may be of the horseshoe shape illustrated in Fig. 13. With this arrangement, float 9a may be turned down into alignment with the tube 10a, in which position this tube will fit into the recess 45 in the counterbalance 44. When so arranged the entire system that is to be disposed within the tank may be inserted through the opening provided therein; and as soon as the lever assembly reaches the interior of the tank, the float, lever and counterbalance will assume an angular position determined by the height of the liquid therein.

My liquid indicator may be constructed as an integral assembly with the upper valve structure, as indicated in Fig. 12. It will readily be understood that the combination shown in Fig. 1 could be an integral device and that the internal structure of member 1 shown in Fig. 2 could be provided in a unitary assembly. In this case the internally threaded portion 4 would be dispensed with, as the structure of Fig. 1 would be integral with the lower part of the valve assembly 15.

My device may of course be used as a gauge without being associated with a valve assembly. For such use, it is not necessary to provide the top opening 4 in member 1, and the ducts 14 may likewise be omitted.

It will be apparent that many other modifications may be made from the illustrated embodiment of the invention herein described, as succinctly defined in the appended claims.

My claims are:

1. A liquid level gauge including: a member formed with a reduced end and having a passageway therethrough for liquid and gas and a recess therein separated from said passageway by an intervening wall; a rectilinearly movable float; guiding means for said float surrounding said float and attached to said reduced end; a first magnetic element connected to said float and mounted for rectilinear movement within said recess in response to the movement of said float; a second magnetic element supported by said member for rotation in response to the movement of said first element and isolated from said first element by an intervening wall; a calibrated scale; an indicator cooperating with said scale; and means for producing relative movement between said indicator and scale in response to the movement of said second element; the magnetic poles of each of said magnetic elements having a separation not materially greater than the distance across its pole faces.

2. A liquid level gauge including: a first member adapted to extend through an opening in a liquid receptacle and having a cavity therein extending upwardly from the lower end thereof; a rectilinearly movable cylindrical float; a cylindrical tube surrounding said float and attached to the lower end of said first member; a first magnetic element adapted to move rectilinearly within said cavity; a rod connecting said float and said first magnetic element; a sleeve surrounding said rod and adapted to move rectilinearly within said cavity beneath said first magnetic element; an extension spring surrounding said rod within said sleeve and having one end attached to said float and the other end appropriately attached to the upper end of said sleeve; a ring surrounding said spring and rod, said ring disposed between said sleeve and said float and acting to support said sleeve; a second magnetic element supported for rotation in response to the movement of said first magnetic element; a calibrated scale; an indicator cooperating with said scale; means for producing relative movement between said indicator and scale in response to the movement of said second magnetic element; and means for adjusting the height of said ring to raise or lower said sleeve and the spring carried therein so that the float, rod and first magnetic element carried by said spring may be adjusted in longitudinal position to bring the indicator and scale to zero reading when the receptacle is empty.

3. A liquid level gauge including: a first member partially insertable through an opening in a liquid receptacle and having a cavity extending upwardly from the lower end thereof and a passageway therethrough isolated from said cavity by an intervening wall to permit the passage of liquid through said member without entering said cavity; a float; a first magnetic element mounted for rectilinear movement within said cavity; a rod connecting said float and said first magnetic element; a guide for said float comprising a tube surrounding said float and rod, said tube being attached to the lower end of said first member; a rectilinearly movable second member surrounding said rod and disposed within said tube between the lower end of said first member and said float; a resilient washer between said second member and the lower end of said passageway, said washer acting to close said passageway upon the upward movement of said second member in response to excessive flow of gas from said receptacle; a second magnetic element supported by said first member for rotation in response to the movement of said first magnetic element; a calibrated scale; an indicator cooperating with said scale; and means for producing relative movement between said indicator and scale in response to the rotation of said second magnetic element.

4. Means for transmitting movement from a rectilinearly movable system to an angularly movable system through an intervening wall, said means including: a pair of magnetic elements each having an inter-pole distance not materially greater than the distance across its pole faces; one of said elements mounted for rectilinear movement, and the other of said elements pivoted between its poles for angular movement, said elements so disposed that their magnetic fields interlock; and a wall of non-magnetic material positioned between said elements.

5. A liquid level gauge including: a member having a first portion constructed for positioning adjacent the exterior of a tank containing the liquid to be measured and a second portion shaped to extend into the interior of the tank, both of said portions formed of non-magnetic material; said member having a recess therein extending from the lower end of said second portion into said first portion, said recess being closed at its upper end; a first magnetic element confined for movement within said recess in a direction parallel to its magnetic axis; a float operatively connected to said first magnetic element; a second magnetic element supported for rotation outside said tank in response to the rectilinear movement of said first magnetic element and disposed so that its magnetic field will interlock with that of said first magnetic element; the average distance through each of said magnetic elements in a direction transverse to its magnetic axis being not materially less than the distance between its magnetic poles; and indicating means operatively connected to said second element.

6. In a liquid level gauge, a float; a first magnetic element operatively connected to said float for rectilinear movement in a direction parallel to its magnetic axis; an indicating device; a second magnetic element operatively connected to said indicating device and rotatably supported so that its magnetic field always interlocks with that of said first magnetic element; the average distance through each of said magnetic elements in a direction transverse to its magnetic axis being not materially less than the distance between its magnetic poles, and the minimum spacing between said elements being not materially greater than the average distance through either of said elements in a direction transverse to the magnetic axis thereof.

7. A liquid level gauge comprising a member having an externally threaded portion for engagement in a threaded opening of a liquid reservoir, a tubular element depending from said threaded portion adapted to be disposed in said reservoir, said member having a recess therein axially aligned and communicating with the opening through said tubular element, said recess having a closed upper end, said member having passageways extending therethrough and spaced around said recess whereby liquid may flow into said reservoir without entering said recess, a first magnetic element, means mounting said element for rectilinear movement within said recess, a float operatively connected to said first magnetic element and positioned within said tubular element, a second magnetic element supported on said member for rotation outside said reservoir in response to the rectilinear movement of said first magnetic element, a calibrated scale carried by said member and an indicator operatively connected to said second magnetic element for movement relative to said scale.

8. A liquid level gauge including: a first member adapted to be attached to an opening in a liquid receptacle, said member having a recess extending upwardly from the lower end of said member; a first magnetic element; means mounting said element for rectilinear movement within said recess; a float operatively connected to said first magnetic element by means of said mounting means; a second magnetic element carried by said first member and pivoted between its poles for rotation in response to the movement of said first magnetic element; a calibrated scale; an indicator adjacent to, and cooperating with, said scale; and means for producing relative movement between said indicator and scale in response to the rotation of said second magnetic element; the magnetic poles of each of said magnetic elements having a separation not materially greater than the distance across its pole faces.

9. A liquid level gauge including: a member adapted to extend through an opening in a liquid container, said member having a recess therein extending upwardly from the lower end thereof; a first magnetic element; means mounting said element for rectilinear movement within said recess; a float operatively connected to said first magnetic element by said mounting means; a second magnetic element carried by said member and isolated from said first element by an intervening non-ferrous wall, said second element being pivoted between its poles for rotation in response to the movement of said first element; a calibrated scale; an indicator adjacent to, and cooperating with, said scale; and means for producing relative movement between said indicator and scale in response to the rotation of said second element; the magnetic poles of each of said magnetic elements having a separation not materially greater than the distance across its pole faces.

A. P. SORBER.

References Cited in the file of this patent

UNITED STATES PATENTS

| Number | Name | Date |
|---|---|---|
| 44,118 | Smith et al. | Sept. 6, 1864 |
| 50,581 | Henis | Oct. 24, 1865 |
| 1,024,377 | Surber | Apr. 23, 1912 |
| 1,040,127 | Bonesteel | Oct. 1, 1912 |
| 1,141,499 | Stahle | June 1, 1915 |
| 1,335,196 | Ritz-Woller | Mar. 30, 1920 |
| 1,423,544 | Schaedler | July 25, 1922 |
| 1,798,434 | Ruopp | Mar. 31, 1931 |
| 2,216,917 | Klumb et al. | Oct. 8, 1940 |
| 2,425,691 | Brewer | Aug. 12, 1947 |